United States Patent
Hutton et al.

[15] 3,656,638
[45] Apr. 18, 1972

[54] HAY DISTRIBUTOR

[72] Inventors: Duane A. Hutton; Wallace Hutton, both of Baker, Oreg.

[73] Assignee: John L. Jacobson, Baker, Oreg. a part interest

[22] Filed: Mar. 26, 1970

[21] Appl. No.: 22,849

[52] U.S. Cl. ............................214/83.14, 214/82, 239/679, 239/681, 198/209
[51] Int. Cl. ....................................................E01c 19/20
[58] Field of Search .................214/83.14, 83.22, 83.18, 82; 239/679, 680, 681, 682

[56] References Cited

UNITED STATES PATENTS

| 989,498 | 4/1911 | Gallaher | 239/679 X |
| 990,472 | 4/1911 | Brown | 239/679 |

FOREIGN PATENTS OR APPLICATIONS

| 512,003 | 6/1952 | Belgium | 239/679 |
| 676,684 | 7/1952 | Great Britain | 239/679 |
| 1,359,185 | 3/1964 | France | 239/679 |
| 1,275,531 | 10/1961 | France | 239/679 |
| 925,862 | 3/1955 | Germany | 239/679 |
| 561,052 | 4/1957 | Italy | 239/679 |

*Primary Examiner*—Gerald M. Forlenza
*Assistant Examiner*—Robert J. Spar
*Attorney*—Clarence A. O'Brien and Harvey B. Jacobson

[57] ABSTRACT

A machine for feeding loose hay to livestock in parallel rows. The machine includes a mobile truck bed having a powered rearwardly moving push gate and a pair of hay distributing cylinders mounted on the rear of the bed for engaging and outwardly feeding the hay. The cylinders mount feeding fingers which grip and move the hay. Strippers are provided for cleaning the feeding fingers and spring-loaded holding fingers are utilized laterally of each cylinder so as to assist in an even distribution of the hay.

12 Claims, 16 Drawing Figures

PATENTED APR 18 1972

Duane A. Hutton
Wallace Hutton
INVENTORS

BY *Clarence A. O'Brien*
and *Harvey B. Jacobson*
Attorneys

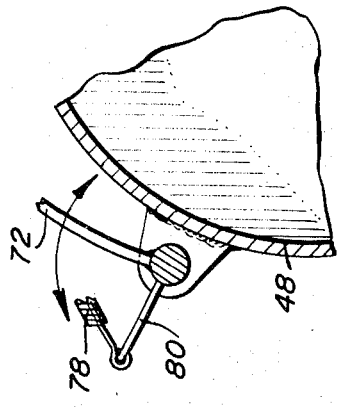
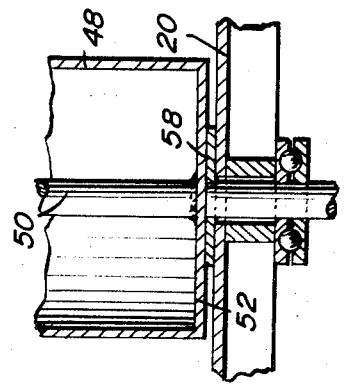
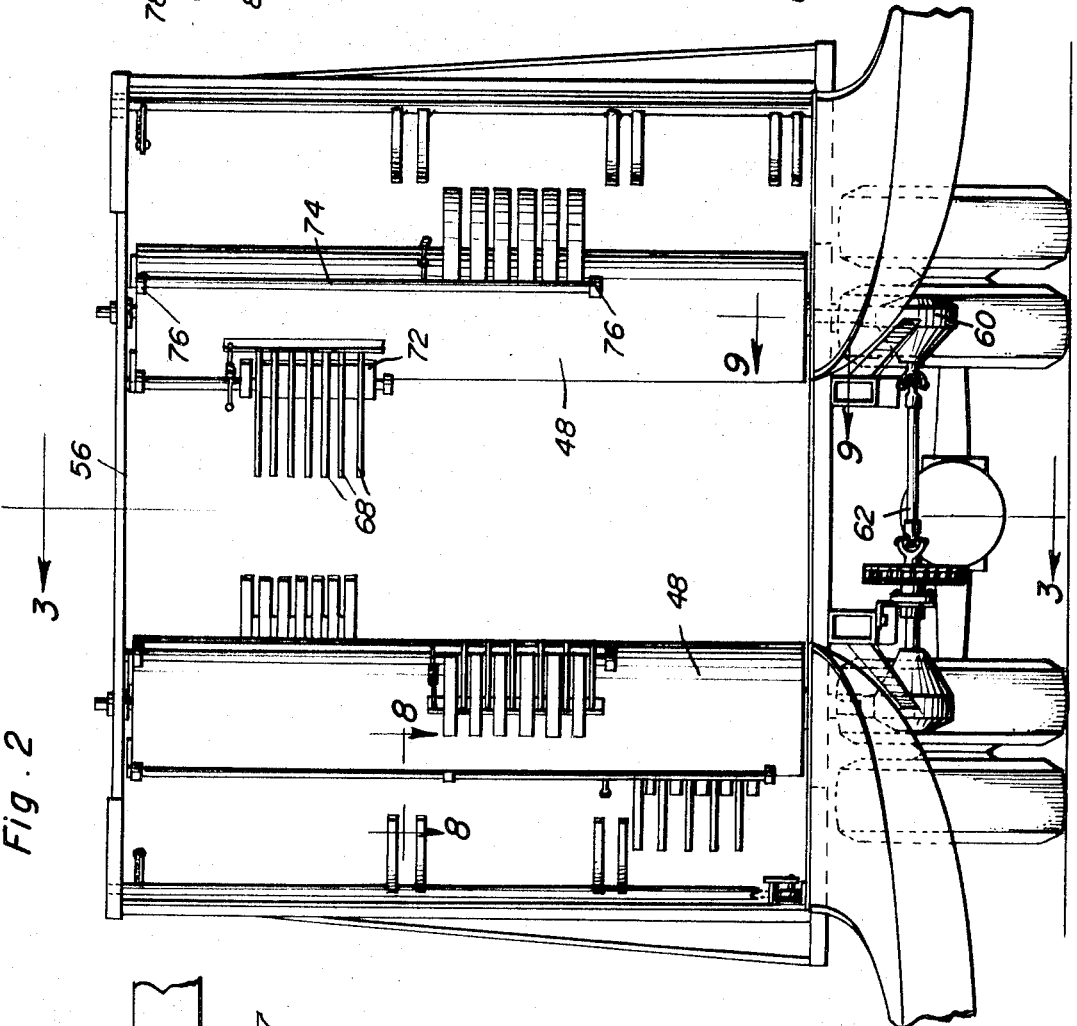
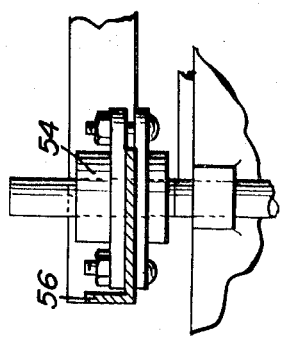
Duane A. Hutton
Wallace Hutton
INVENTORS

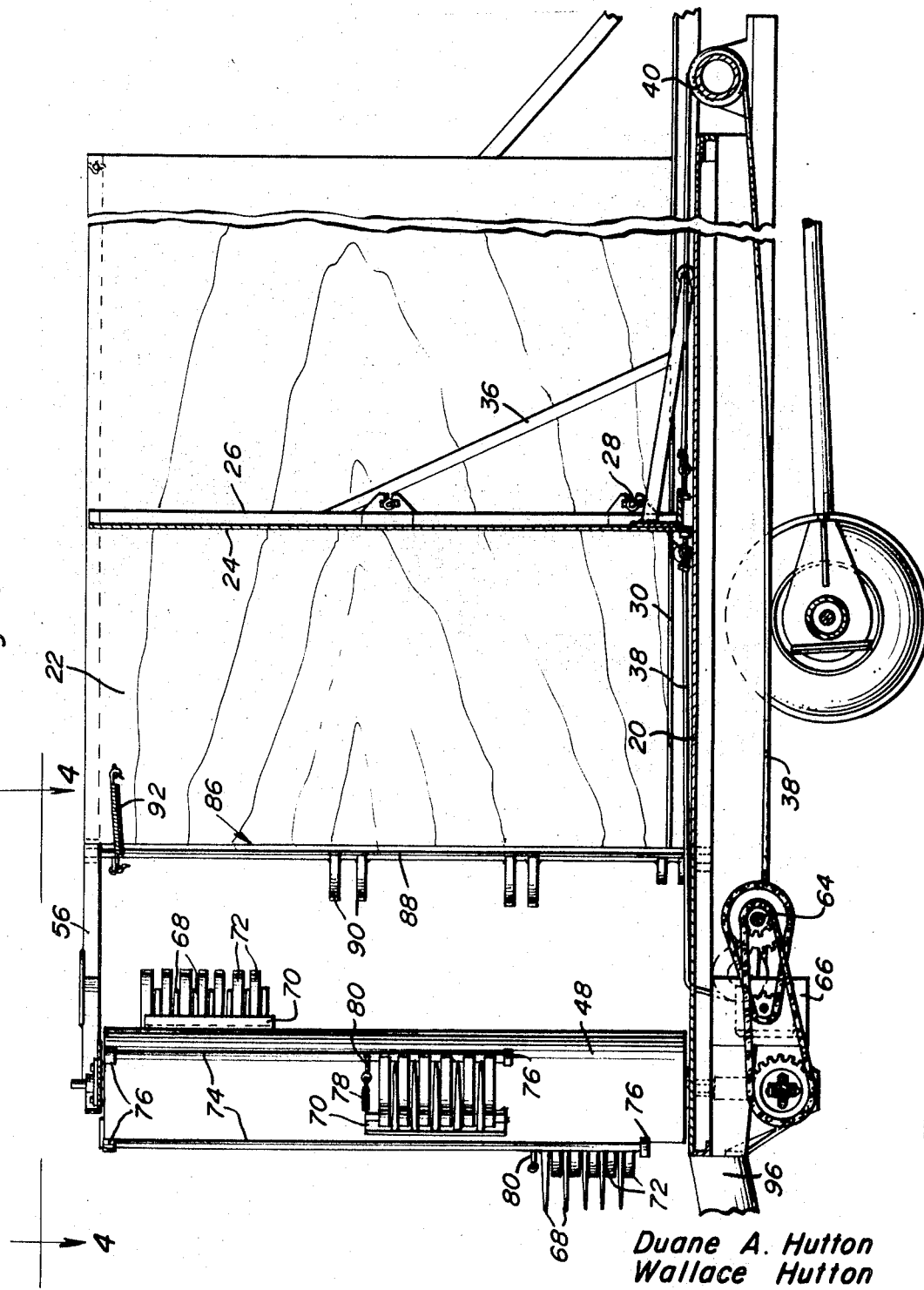

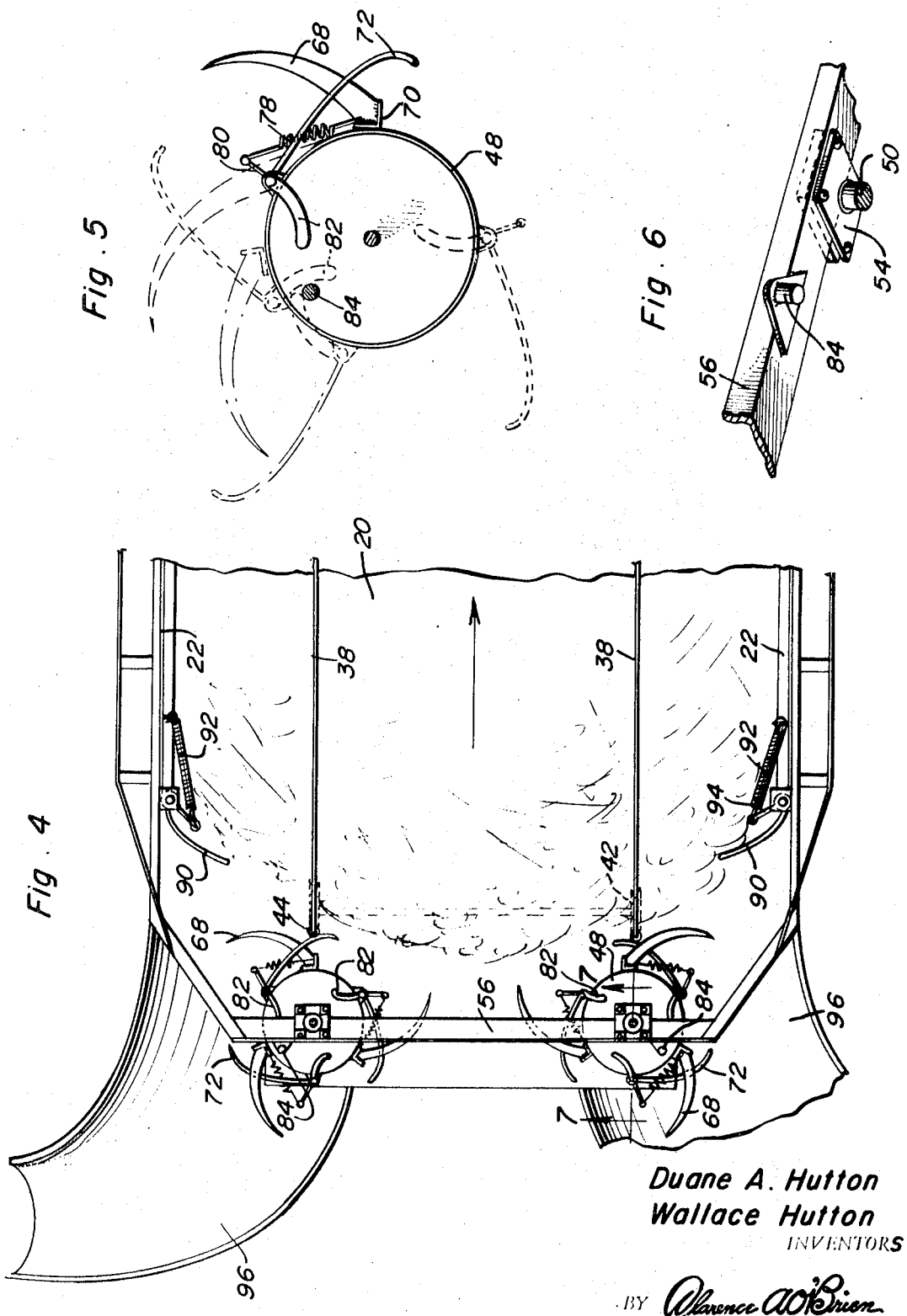

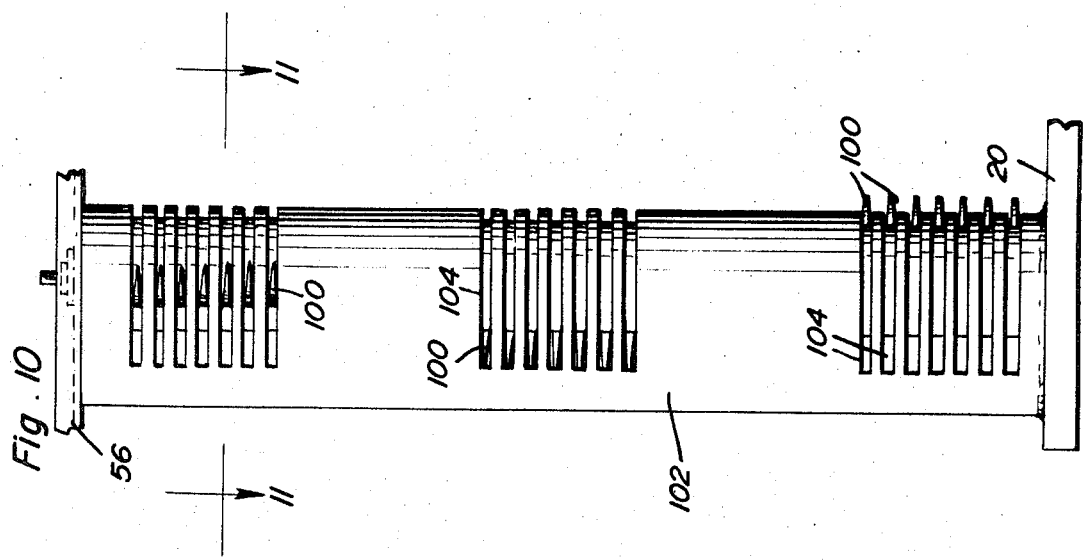
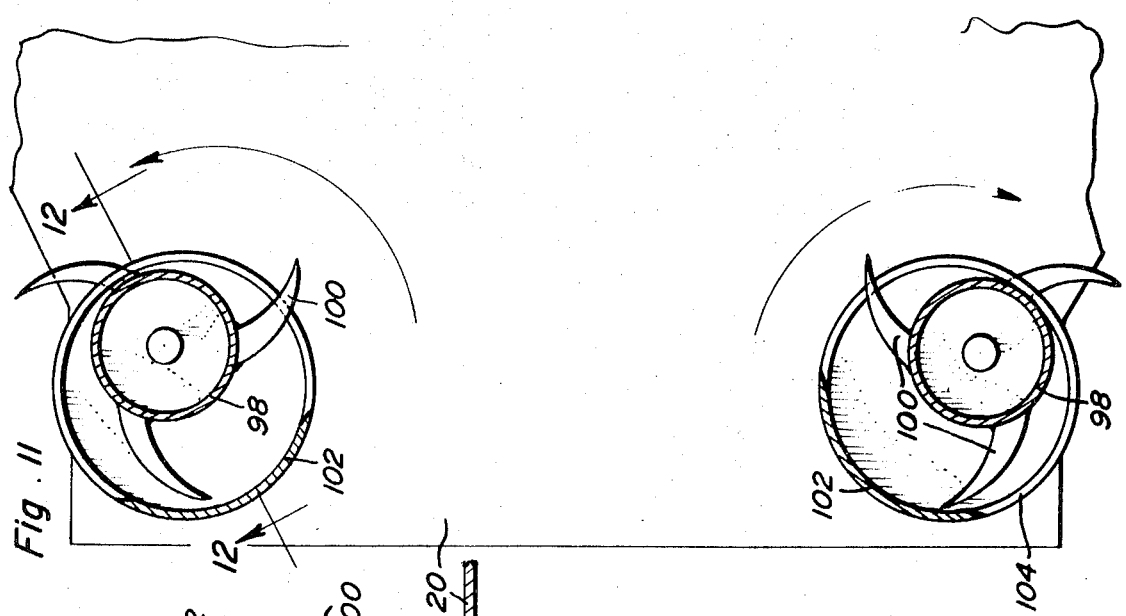
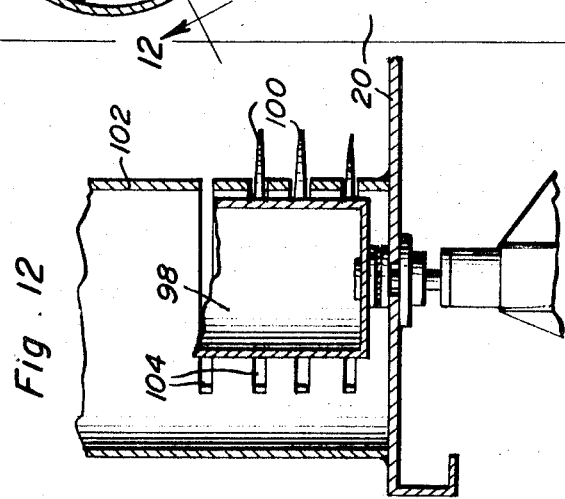
Duane A. Hutton
Wallace Hutton
INVENTORS

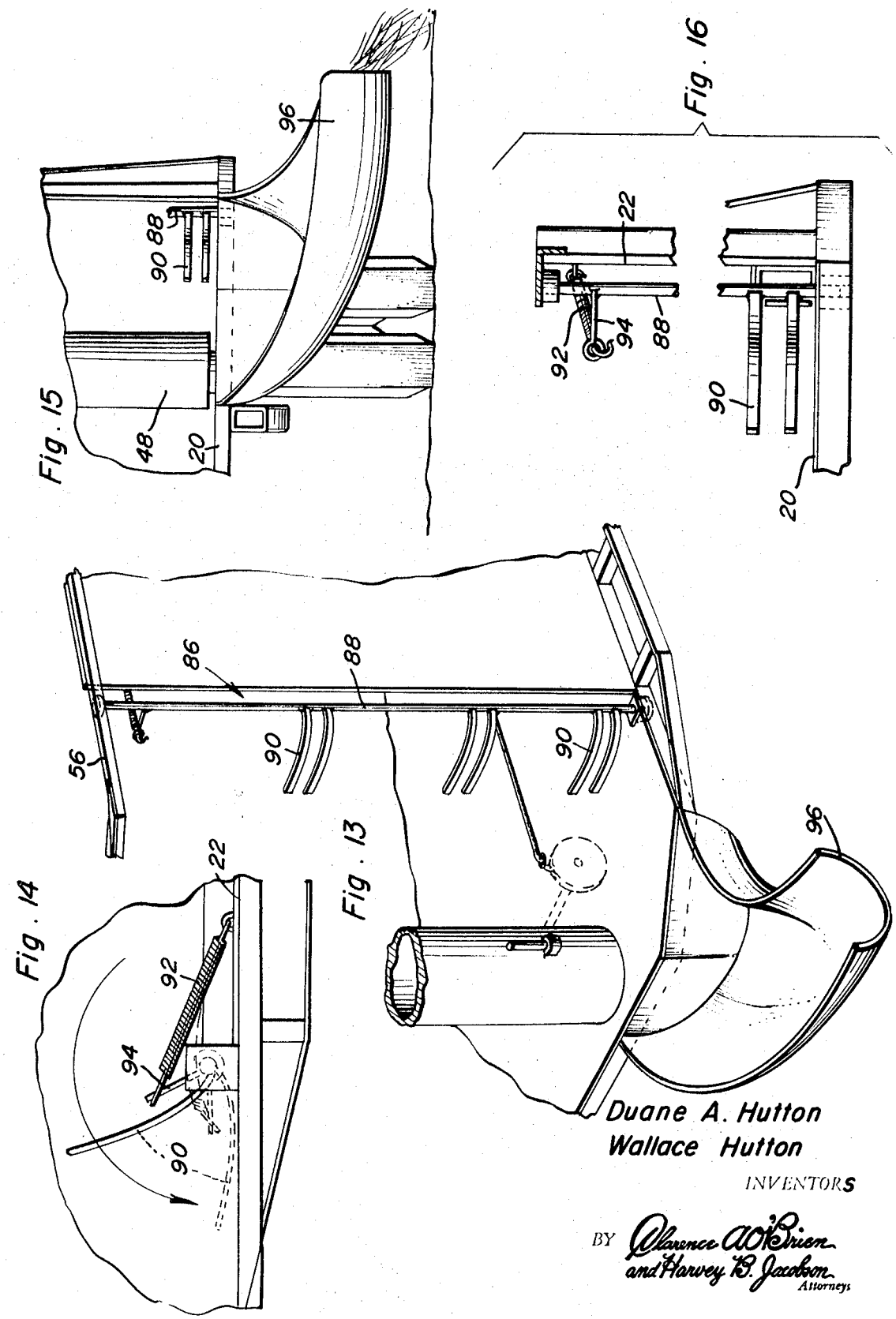

HAY DISTRIBUTOR

The present invention is concerned with the distribution or feeding of hay to livestock in the field, and more particularly relates to a hay distributor which combines a mobile truck bed with hay moving and distributing apparatus so as to provide a self-contained unit for the transporting and distributing of the hay.

It is a primary object of the instant invention to provide a hay distributor which can effectively distribute large quantities of hay to two parallel rows for convenient access thereto by livestock.

In conjunction with the above object, it is also a significant object of the instant invention to provide a hay distributor wherein the hay being distributed is positively engaged and outwardly thrown with the amount of hay moved being in effect regulated so as to achieve an even distribution thereof.

Other objects of the instant invention include the provision of apparatus which, while unique in construction, is relatively simple, highly efficient, and operationally trouble free.

Basically, the objects of the instant invention are achieved through the provision of a mobile truck bed having a full width powered push gate thereon utilized to selectively rearwardly move a load of hay. The rear of the truck bed is open and has a pair of laterally spaced vertical distributing members thereon, each provided with a series of hay grasping and distributing fingers at points thereabout and there along. These vertical members are rotatably driven so as to engage the distributing fingers with the rearwardly forced hay for effecting a regulated outward throwing of the hay so as to form two rows rearward of the forwardly moving truck bed. The distributing fingers are selectively cleaned by strippers or stripping fingers so as to ensure a continuous positive engagement with the hay. Retaining fingers are also utilized so as to resiliently retain the hay until positively outwardly moved by the distributing fingers, and rearwardly and laterally directed chutes can be utilized so as to further facilitate a proper placing of the hay as it is moved from the truck bed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is an enlarged rear elevational view of the apparatus;

FIG. 3 is a cross-sectional view taken substantially on a plane passing along line 3—3 in FIG. 2;

FIG. 4 is a partial top plan view taken substantially on a plane passing along line 4—4 in FIG. 3;

FIG. 5 is a detail view illustrating the operation of the strippers or stripping fingers;

FIG. 6 is a perspective detail of the overhead beam at the upper end of one of the distributing cylinders;

FIG. 7 is an enlarged sectional detail taken substantially on a plane passing along line 7—7 in FIG. 4;

FIG. 8 is a cross-sectional detail taken substantially on a plane passing along line 8—8 in FIG. 2;

FIG. 9 is an enlarged cross-sectional detail taken substantially on a plane passing along line 9—9 in FIG. 2;

FIG. 10 illustrates a modified form of hay distributing cylinder;

FIG. 11 is a cross-sectional detail taken substantially on a plane passing along line 11—11 in FIG. 10;

FIG. 12 is a cross-sectional detail taken substantially on a plane passing along line 12—12 in FIG. 11;

FIG. 13 is a perspective detail of a rear corner of the apparatus;

FIG. 14 is a detail illustrating the operation of the retaining fingers;

FIG. 15 illustrates the orientation and use of one of the hay directing chutes; and FIG. 16 is a detail view illustrating the structure of one of the retaining finger units.

Figure 1:
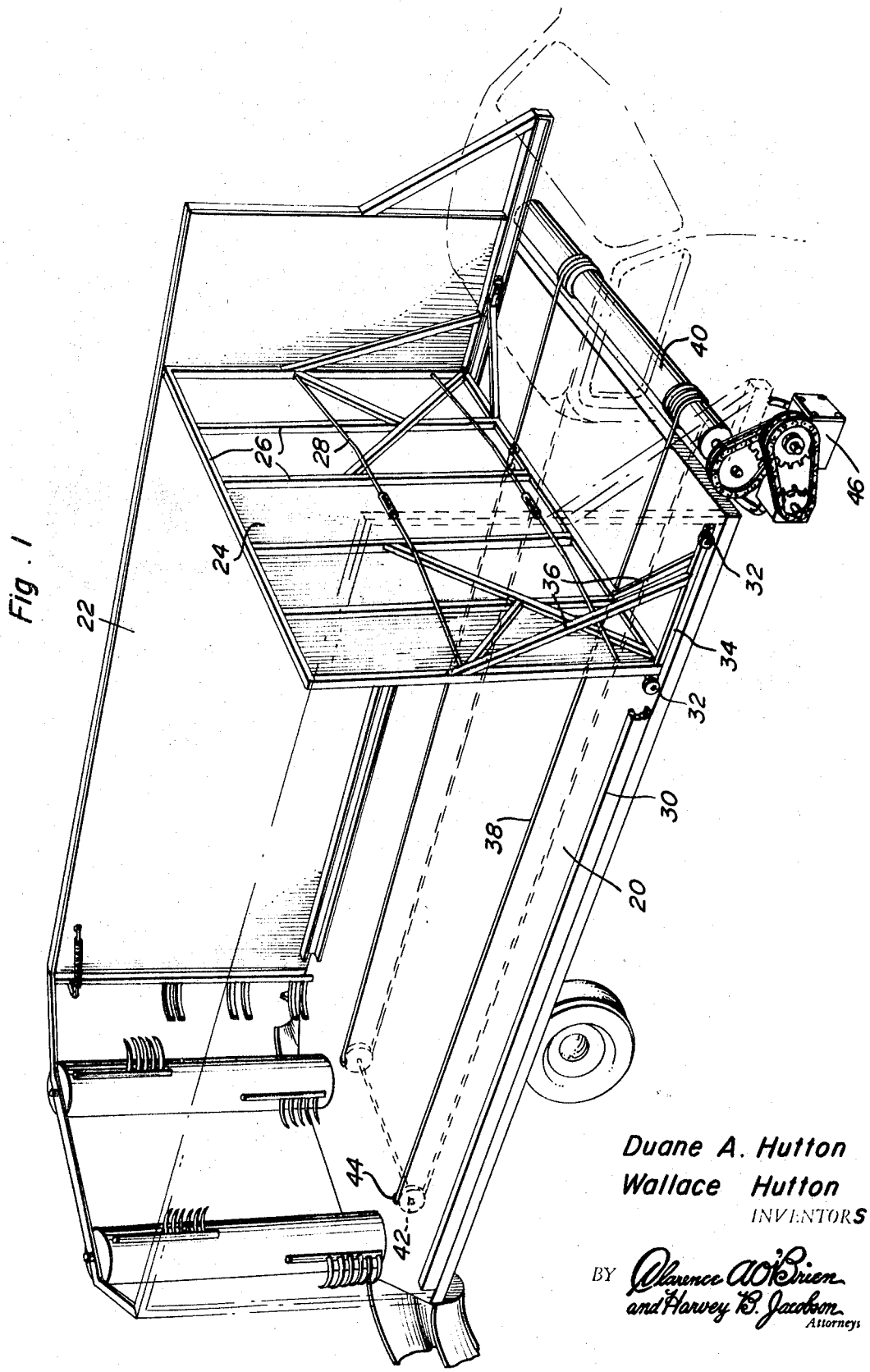
FIG. 1 is a perspective view, with portions broken away for purposes of illustration, of the hay distributing apparatus comprising the instant invention.

Referring now more specifically to the drawings, the hay distributing apparatus of the instant invention includes an enlarged mobile truck bed 20 having two substantially full length opposed side walls 22 and opening rearwardly therebetween. The bed 20 is to receive the load of hay for selective distribution through the open rear end thereof by suitable apparatus mounted on the rear end portion of the deck 20. Inasmuch as the distribution of hay is to be effected from the rear of the deck or bed 20, a full width vertical push gate 24 is provided across the bed 20 between the side walls 22 for effecting a selective and controlled rearward movement of hay to the rearwardly located distributing apparatus. This push gate 24 includes a planar front face rearwardly braced by appropriate horizontal and vertical bars 26 and turnbuckle tensioned transverse rods 28. The movable gate 24 is guided for movement along the bed 20 by a pair of opposed inwardly directed channel tracks 30 mounted along the opposed edges of the bed 20, the gate 24 having a pair of track received wheels 32 supporting each side thereof. Each of these pairs of wheels 32 includes a forward wheel bracket mounted on the gate immediately in front and to the side thereof, and a rearwardly located wheel 32 mounted on a rearwardly extending beam or bar 34 affixed to the corresponding lower corner of the gate 24 and in turn mounting diagonal bracing bars 36 which extend from the bar to the push-up gate 24 for a stabilizing of the vertically orientated gate 24.

The controlled movement of the push gate 24 is effected by a pair of cables 38, each being wound on and controlled by a powered winch drum 40 mounted immediately forward of the bed 20. Each cable 28 encircles the bed 20, extending there along both above and below the bed 20 and over a remote pulley 42 mounted immediately below the bed 20 adjacent the rear discharge end thereof, the bed 20 having an appropriate cable passing aperture 44 therein immediately adjacent each of the pulleys 42. The extreme ends of each of the cables 38 are in turn affixed to the push gate 24 adjacent the lower edge thereof. In this manner, the upper run of each of the cables 38 lies on the bed 20 and does not interfere with, and is not interfered with by, the moving hay. The powering of the cable mounting winch drum 40 will preferably be effected by an appropriate hydraulic motor 46 operatively engaged with the drum 40 by a chain and gear drive train as suggested in FIG. 1.

The actual distributing of the hay from the rear of the bed 20, as the hay is pushed rearwardly thereto by the push gate 24, is effected by a pair of vertical distributing members 48, normally in the nature of enlarged cylinders. These members or cylinders 48 are located in laterally spaced relation to each other and in inwardly spaced relation to the adjoining ends of the side walls 22, the discharging hay exiting between each cylinder 48 and the adjoining side wall 22 so as to form two laterally spaced ground rows. Each of the cylinders 48 is mounted by means of a coaxial shaft 50 fixed to the opposed upper and lower cylinder end walls 52 and projecting therebeyond. The projecting upper end of the central mounting shaft 50 of each cylinder 48 is rotatably received within an appropriate bearing unit 54 affixed to a transverse overhead beam 56 spanning and interconnecting the rear upper ends of the side walls 22. The lower end wall 52 of each cylinder 48 seats on an appropriate wear plate 58 or the like, while the lower projecting end of the shaft 50 extends through the bed 20 and into the drive unit. This drive unit can constitute an individual hydraulic motor for each cylinder 48 or, as illustrated, a shaft connected pair of gear boxes 60, each receiving and driving one of the cylinders 48 with the connecting shaft 62 between the gear boxes being driven from a jackshaft 64 which is in turn driven by a single chassis-mounted motor 66.

The two cylinders or cylindrical members 48 rotate laterally outward and rearward relative to each other so as to discharge laterally and rearwardly of the forwardly moving mobile bed 20. The actual engagement of and outward throwing of the bed loaded hay is effected by several vertical sets of horizontally orientated distributing fingers 68 mounted in vertically and peripherally spaced relation to each other about each cylinder 48. Each set of distributing fingers 68 is vertically spaced a slight distance from the adjoining set or sets of fingers 68 with the fingers being orientated along substantially the full height of the members 48 so as to ensure a proper discharge of the hay from a fully loaded bed 20. In addition, the peripheral offset provided between the sets of distributing fingers 68 tends to balance the rotating cylinders 48 and provide for a progressive engagement and moving of a predetermined amount of hay whereby a smooth distribution thereof is effected without introducing excessive loads into the system.

Noting FIGS. 4 and 5 in particular, it will be appreciated that the distributing fingers 68, of each set of such fingers, have the inner ends thereof rigidly affixed, through a mounting angle iron 70 or the like, to the corresponding cylinder 48 and project outwardly therefrom, curving along the length thereof in the direction of rotation. Each of the fingers 68 tapers from a relatively wide mounted inner end to a narrow pointed outer end which can easily engage in the hay to be outwardly moved and distributed thereby. Further, the fingers 68 are generally angled forwardly along the direction of rotational travel, this angular orientation in addition to the curving configuration of the fingers 68 tending to effectively grasp and retain the hay as it is moved outwardly from the bed 20 for lateral and rearward discharge.

Each set of hay distributing fingers 68 has a set of strippers or stripping fingers 72 associated therewith, the stripping fingers 72 alternating with the distributing fingers 68. The stripper fingers 72 of each set have the inner ends thereof rigidly affixed to a vertical rod 74 rotatably mounted in lower and upper bearings 76 affixed to the cylinder or cylindrical member 48 forward of the mounted ends of the distributing fingers 68. The stripping fingers 72 are angled rearwardly into overlapped alternating orientation relative to the distributing fingers 68 with the pivotal or rotatable mounting of the finger mounting rod 74 enabling a swinging of the stripper or stripping fingers 72 from an inner position adjacent the cylinder 48 and toward the inner ends of the associated fingers 68 to an outer position swung to or slightly beyond the free outer ends of the distributing fingers 68. These various positions are illustrated in FIG. 5. Each set of stripping fingers 72 is mounted on a separate rod 74 with each of the rods 74 having the upper bearing thereof located at the upper end of the corresponding cylinder 48 and the upper end of the rod 74 itself projecting slightly above the cylinder 48. As such, it will be appreciated that the length of the rods 74 associated with the various sets of stripper fingers will vary in accordance with the specific vertical location of the stripping fingers.

As previously indicated, the outward and rearward rotation of the cylinders 48 engages the distributing fingers 68 with the hay for a lateral rearward movement thereof. This engagement of the distributing fingers 68 with the hay tends to retain the stripping fingers 72 at their inwardly swung position. If so desired, a biasing spring 78, extending between a short arm 80 on each finger mounting rod 74 and the laterally located angle 70, can be utilized so as to resiliently retain the stripping fingers 72 in their inwardly swung position. As the distributing fingers 68 move outwardly, discharging the hay from the bed 20, it is desirable to activate the stripping fingers 72 in a manner whereby these fingers swing outwardly tending to effectively strip any remaining hay from the distributing fingers 68 so as to ensure a complete removal of the hay and clear the fingers 68 for a re-engagement with the bed loaded hay. This outward swinging of the stripping fingers 72 is effected by affixing rigidly a slightly arcuate arm 82 to the upper end of each of the finger mounting rods 74, these arms 82 projecting inwardly in overlying relation to the upper end of the corresponding cylinder 48 and selectively engaging against and sliding along a downwardly projecting lug 84 affixed to the overhead support beam 56 which spans the two upper rear corners of the side walls 22 and mounts the upper ends of the cylinders 48. The lugs 84, one associated with each cylinder 48, are so located as to engage the arms 82 as the cylinders 48 rotate and the sets of distributing fingers 68 are sequentially moved into the hay discharging position thereof. Once the arms 82 slide past the beam mounted associated lugs 84, the stripping fingers 68 are, if spring-loaded, swung back into the inner or retracted position thereof. If not spring-loaded, the re-engagement of the distributing fingers 68 with the push gate advanced hay will effect an automatic retraction of the stripping fingers 72 which are now freely pivoted. In either case, the full working length of the distributing fingers is exposed for engagement with the hay. The sequential operation of the stripping fingers has been schematically illustrated in FIG. 5. Incidentally, it will be noted that the stripping fingers 72 are vertically orientated and relatively wide so as to ensure a complete stripping or cleaning of the hay from between the distributing fingers 68.

In order to assist in obtaining an even distribution of the hay on the ground by the action of the distributing fingers 68, each side of the load carrying bed 20 is provided with a hay holding unit 86 located outwardly of the corresponding distributing cylinder 48 and immediately adjacent the rear edge of the corresponding side wall 22. Each holding unit 86 includes a vertically elongate rod 88 rotatably mounted between the bed and the overhead beam 56. This rod 88 has a plurality of vertically spaced sets of holding fingers 90 thereon. The fingers 90 extend generally toward the corresponding cylinder 48 and curve slightly inwardly toward the bed 20, terminating slightly short of the outer ends of the distributing fingers 68. Each rod 88 is spring-loaded by an elongated coiled tension spring 92 engaged between an outwardly projecting arm 94 rigid with the rod and the adjoining side wall 22 inwardly of the rod 88. The normal or hay retaining position of the hold back fingers 90 is as illustrated in FIG. 4, the fingers 90 extending generally toward the associated cylinder 48. However, as the hay is engaged and outwardly moved by the distributing fingers 68, the hold back fingers 90 tend to pivot outwardly so as to parallel the corresponding side wall 22 and allow for a passage of the finger forced hay thereby. Thus, an equalized distribution of the hay can be easily effected, the hay on the bed being retained until positively moved past the outwardly swingable hold back fingers 90.

As a further aid in obtaining an equalized row-like distribution of the hay, specific rearwardly and laterally directed discharge chutes 96 can also be utilized. These chutes, one associated with each hay distributing unit, will be affixed to the rear of the bed and in hay receiving orientation between the corresponding cylinder 48 and adjacent side wall 22. As will be appreciated from the drawings, and in particular FIGS. 13 and 15, the chutes 96 will curve rearwardly, laterally and downwardly for a discharge of the hay laterally of and immediately to the rear of the vehicle. It will of course be appreciated that the chute 96 is generally scoop shaped so as to retain the hay received therein until the hay is discharged through the open rear end thereof.

Attention is now specifically directed to FIGS. 10, 11 and 12 wherein a modified form of distributing unit has been illustrated. This unit includes a vertically orientated rotatably mounted cylinder or cylindrical member 98, mounted and operated much in the manner of the cylinders 48. The cylinder 98 includes several vertical sets of hay distributing fingers 100 rigidly affixed at the inner ends thereof to the cylinder 98 and projecting outwardly therefrom, curving slightly along the direction of rotation of the cylinder 98. Each of the cylinders 98, two such cylinders being provided, is surrounded by an eccentrically position outer casing or cylindrical shell 102, the upper and lower ends of which are rigidly fixed to the underlying bed 20 and overlying crossbeam 56. This cylindrical casing 102 is provided with vertically spaced series of horizontal slots or slits 104 which accommodate and allow a selective outward projecting of the distributing fingers 100 as the inner cylindrical member 98 is rotated relative to its casing 102. Each casing 102 is so orientated relate to its associated inner rotating cylinder 98 as to allow for an outward movement of the distributing fingers 100 as the fingers approach and move into the hay on the bed 20. As each cylinder 98 rotates and the distributing fingers 100 associated therewith move outwardly toward the discharge corner of the bed 20, the hay discharges therefrom with the continued rotation of the cylinder 98 resulting in a retraction of the distributing fingers 100 into the outer cylindrical casing 102, and hay residue remaining on the fingers being easily stripped therefrom by the slitted configuration of the casing 102. In this manner, each casing 102 acts as a stripper for a continuous cleaning of the distributing fingers 100. As was the case with the initially described distributing fingers 68, the sets of distributing fingers 100 are both vertically and rotationally spaced from each other for a sequential movement through the vertically spaced sets of slots 104. As will be appreciated, the distributing units of FIGS. 10, 11 and 12 can also be utilized in conjunction with hold back units 86 and hay receiving and positioning chutes 96 and will similarly be mounted on a load receiving bed 20 having an appropriate push gate 24 associated therewith.

From the foregoing, it will be appreciated that a highly unique hay distributing system has been defined, this system providing, through an arrangement of rotating cylinders having distributing fingers thereon, an equal distribution of hay in two rows rearwardly and to the opposite sides of a forwardly moving hay carrying vehicle. The hay engaging and distributing fingers are maintained clean, and a positive discharge of the hay therefrom is effected through the incoorporation of strippers arranged so as to systematically by-pass the distributing fingers and thus ensure a complete removal of the hay therefrom, the strippers either being stationary relative to the rotating finger carrying cylindrical members, or mounted directly on the cylindrical members and selectively movable relative thereto. Incidently, while not specifically referred to above, the machine can also be used to distribute baled hay if so desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A distributor for hay or the like comprising a load bed, said bed having a rear discharge end, a distributing unit mounted on the discharge end thereof, said distributing unit extending upwardly from the bed and being located to one side of the discharge end, said distributing unit including a rotatably mounted vertical member, distributing means on said member for a selective engagement with hay or the like on the bed as the member rotates, and means for rotating said member laterally outward and rearward for effecting a lateral and rearward discharge of hay or the like by the distributing means on the vertical member, said distributing means comprising a plurality of outwardly projecting distributing fingers on said vertical member for selective engagement with the hay or the like as the member rotates, said distributing fingers being arranged in vertically spaced sets of fingers, said fingers curving slightly along the path of rotational movement of the member, said sets of distributing fingers being peripherally spaced from each other about said members for a sequential engagement with the hay or the like, the distributing unit including stripper means associated with said distributing fingers for a selection stripping of hay from the distributing fingers generally in the area of discharge of the hay through a relative movement between the distributing fingers and the stripper means, said stripper means comprising stripping fingers pivotally mounted on said member, said stripping fingers alternating with said distributing fingers and extending therebetween, and means for selectively moving said stripping fingers outwardly toward the outer ends of said distributing fingers in response to a predetermined rotation of said member.

2. The distributor of claim 1 including hold back means located generally laterally of the distributing unit, said hold back means being vertically orientated and selectively movable between a hay holding position and a rearwardly swung hay passing position in response to a movement of the hay thereby through the operation of the distributing unit.

3. The distributor of claim 2 wherein said hold back means includes a series of horizontally orientated vertically spaced fingers generally alternating with the distributing fingers and laterally spaced therefrom.

4. The distributor of claim 3 including a hay directing chute outwardly of and in hay receiving orientation relative to the distributing unit, said chute extending downwardly, rearwardly and laterally of the bed.

5. The distributor of claim 4 including a powered push gate mounted on said bed, and means for selectively rearwardly moving the push gate for a rearward pushing of bed loaded hay, or the like.

6. The distributor of claim 5 including a second duplicate distributing unit located to the second side of the discharge end of the bed and operating in opposed relationship to the first mentioned distributing unit for effecting a lateral and rearward discharge of hay to the second side of said bed.

7. The distributor of claim 6 including hold back means mounted on said bed and operatively associated with the second distributing unit.

8. The distributor of claim 1 wherein said stripping fingers are arranged in sets corresponding to the distributing finger sets, the stripping fingers of each set each having one end thereof rigidly affixed to a vertically elongated rod, said fingers projecting outwardly from said rod between said distributing fingers of the corresponding set, and means pivotally mounting said rod on the member to define the pivotal mounting of the stripping fingers.

9. The distributor of claim 8 wherein the means for selectively moving said stripping fingers comprises an arcuate arm fixed to and projecting from the upper end of each rod, and a fixed position depending lug above said member in the path of movement of said arm as the member rotates to effect, upon engagement of the arm thereagainst, a rotation of the corresponding rod and an outward pivoting of the stripping fingers until passage of the arm beyond the lug.

10. A distributor for hay or the like comprising a load bed, said bed having a rear discharge end, a distributing unit mounted on the discharge end thereof, said distributing unit extending upwardly from the bed and being located to one side of the discharge end, said distributing unit including a rotatably mounted vertical member, distributing means on said member for a selective engagement with hay or the like on the bed as the member rotates, and means for rotating said member laterally outward and rearward for effecting a lateral and rearward discharge of hay or the like by the distributing means on the vertical member, said distributing means comprising a plurality of outwardly projecting distributing fingers on said vertical member for selective engagement with the hay or the like as the member rotates, the distributing unit including stripper means associated with said distributing fingers for a selective stripping of hay from the distributing fingers generally in the area of discharge of the hay through a relative movement between the distributing fingers and the stripper means, said stripper means comprising stripping fingers pivotally mounted on said member, said stripping fingers alternating with said distributing fingers and extending therebetween, and means for selectively moving said stripping fingers outwardly toward the outer ends of said distributing fingers in response to a predetermined rotation of said member.

11. The distributor of claim 10 including a hay directing chute outwardly of and in hay receiving orientation relative to the distributing unit, said chute extending downwardly, rearwardly and laterally of the bed.

12. The distributor of claim 11 including a second duplicate distributing unit located to the second side of the discharge end of the bed and operating in opposed relationship to the first mentioned distributing unit for effecting a lateral and rearward discharge of hay to the second side of said bed.

* * * * *